W. N. BARTLETT.
OPERATING DEVICE FOR CAMERA SHUTTERS.
APPLICATION FILED NOV. 2, 1915.
1,205,079.
Patented Nov. 14, 1916.
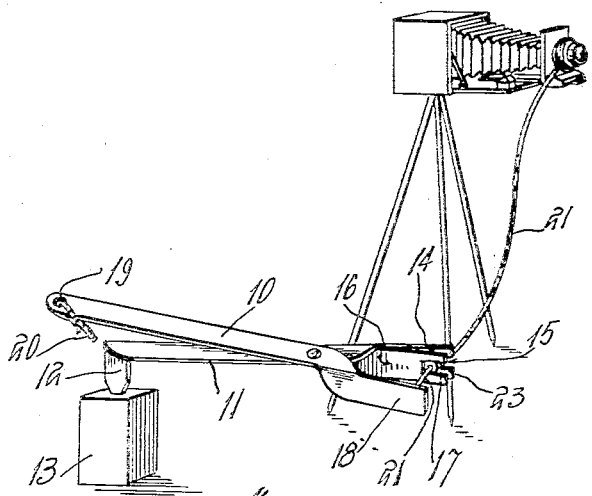
Fig. 1.
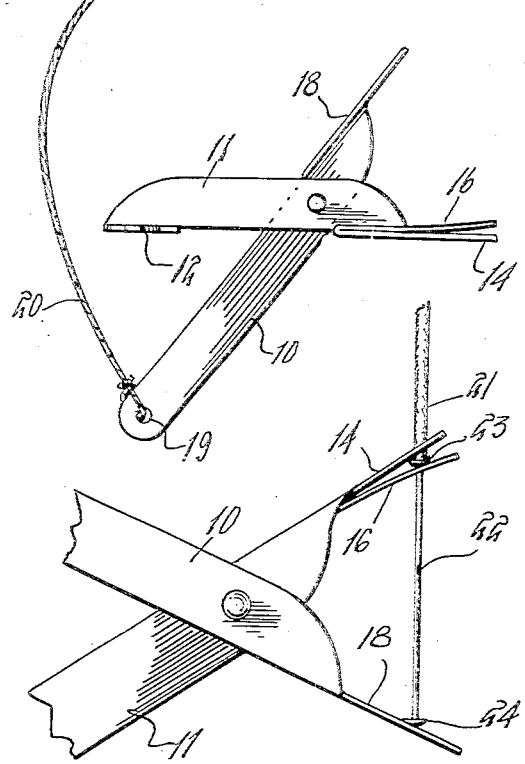
Fig. 2.
Fig. 3.
Witnesses
Inventor
W. N. Bartlett.
By
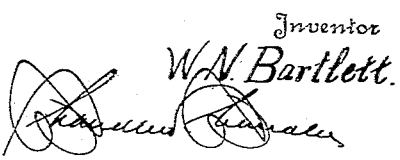
Attorneys

UNITED STATES PATENT OFFICE.

WILLIS N. BARTLETT, OF PORTERVILLE, TEXAS.

OPERATING DEVICE FOR CAMERA-SHUTTERS.

1,205,079.  Specification of Letters Patent.  Patented Nov. 14, 1916.

Application filed November 2, 1915. Serial No. 59,291.

*To all whom it may concern:*

Be it known that I, WILLIS N. BARTLETT, a citizen of the United States, residing at Porterville, in the county of Loving, State of Texas, have invented certain new and useful Improvements in Operating Devices for Camera-Shutters; and I do hereby declare the following to be a full, clear, and exact description of the invention, such as will enable others skilled in the art to which it appertains to make and use the same.

This invention relates to operating devices for camera shutters.

The object of the invention is to provide an operating device for camera shutters embodying an improved construction whereby the shutter of the camera may be actuated by the operator while the latter is disposed within the focus of the camera and he may thereby photograph himself.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view showing the device operatively associated with a camera; Fig. 2, a bottom view of the device, and Fig. 3, a view of a fragment of what is shown in Fig. 2 with the flexible shutter cable operatively applied.

Referring to the drawings the invention is shown as comprising a pair of pivotally connected arms 10 and 11. One end of the arm 11 terminates in a laterally directed prong 12 which is adapted to be driven into a suitable support 13 as shown in Fig. 1. The end of the arm 11 remote from the prong 12 is provided with a laterally disposed head 14 which is bent so as to lie substantially in a plane at right angles to the plane of the arm. The outer end of this head 14 is provided with a recess 15 for a purpose that will presently appear. The rear end of the head is separated from the arm 11 and is bent upon the forward end so as to form a spring arm 16, the free end of said arm being provided with a recess 17 which registers with the recess 15. The end of the arm 10 adjacent the head 14 is provided with a laterally disposed portion 18 which is also bent so as to lie in a plane at right angles to the plane of the arm 10. It will thus be apparent that the heads 14 and 18 form coöperating jaws. The end of the arm 10 remote from the head 18 is provided with an opening 19 in which is adapted to be secured an operating cord 20. The flexible shutter cable is of the usual construction and comprises an outer casing 21 and an inner wire 22 slidable in the casing 21. The casing 21 is provided with a flange 23 while the wire 22 is provided with a head 24.

In the use of the device same is secured to a suitable support 13 in the manner shown in Fig. 1. The flange of the casing 21 is then inserted between the arm 16 and the head 14, said casing being disposed in the recess 15 and the wire 22 extending through the recess 17. The head 24 of the wire 22 bears against the head 18. With the parts in this position it will be obvious that when the cord 20 is pulled by the operator stationed in front of the camera the shutter will be actuated for the purpose of enabling him to take his own picture.

What is claimed is:—

A device of the class described comprising pivotally connected arms provided at corresponding ends with enlarged portions bent to lie in planes at right angles to the planes of respective arms and forming coöperating jaws, a spring arm mounted upon the inner side of one jaw and provided with a recess in its free end registering with a recess in the corresponding end of the related jaw, a lateral prong on the other end of one arm, and means for attaching an operating cord to the other end of the other arm.

In testimony whereof, I affix my signature, in the presence of two witnesses.

WILLIS N. BARTLETT.

Witnesses:
J. S. LESTER,
HARRY W. HEILLS.